United States Patent
Keppy

(10) Patent No.: US 9,453,442 B2
(45) Date of Patent: Sep. 27, 2016

(54) METHOD FOR REGENERATING AN EXHAUST GAS AFTERTREATMENT DEVICE

(71) Applicant: Robert Bosch GmbH, Stuttgart (DE)

(72) Inventor: Brent D. Keppy, Waterford, MI (US)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 14/577,721

(22) Filed: Dec. 19, 2014

(65) Prior Publication Data
US 2016/0177793 A1 Jun. 23, 2016

(51) Int. Cl.
*F01N 3/00* (2006.01)
*F01N 3/025* (2006.01)
*F01N 3/20* (2006.01)

(52) U.S. Cl.
CPC .............. *F01N 3/025* (2013.01); *F01N 3/208* (2013.01)

(58) Field of Classification Search
CPC .. F01N 2430/00; F01N 9/002; F01N 3/0875; F01N 3/035; F01N 3/0842; F01N 13/035; F02D 2041/026; F02D 41/029
USPC .......................................... 60/295, 297, 301
See application file for complete search history.

(56) References Cited

U.S. PATENT DOCUMENTS

| | | | |
|---|---|---|---|
| 6,188,944 B1 | 2/2001 | Kolmanovsky et al. | |
| 6,195,985 B1 * | 3/2001 | del Re | B60K 6/46 123/DIG. 11 |
| 6,390,948 B1 * | 5/2002 | Jain | B60W 10/06 477/121 |
| 6,716,136 B2 | 4/2004 | Hrovat et al. | |
| 6,716,137 B1 | 4/2004 | Kolmanovsky et al. | |
| 6,738,702 B2 | 5/2004 | Kolmanovsky et al. | |
| 7,028,670 B2 | 4/2006 | Doering | |
| 7,059,114 B2 | 6/2006 | Tang et al. | |
| 7,159,387 B2 | 1/2007 | Surnilla et al. | |
| 7,249,583 B2 | 7/2007 | Bidner et al. | |
| 7,647,766 B2 | 1/2010 | Surnilla et al. | |
| 7,735,314 B2 | 6/2010 | Lu et al. | |
| 8,424,295 B2 | 4/2013 | Bidner et al. | |
| 8,612,119 B2 | 12/2013 | Wang et al. | |
| 8,752,364 B2 | 6/2014 | Guo et al. | |
| 8,784,264 B2 | 7/2014 | Gibson et al. | |
| 2004/0200213 A1 * | 10/2004 | Igarashi | F01N 3/023 60/295 |
| 2004/0226287 A1 * | 11/2004 | Edgar | F01N 3/023 60/295 |
| 2008/0282674 A1 * | 11/2008 | Gonze | B60K 6/48 60/285 |
| 2009/0025371 A1 * | 1/2009 | Hermansson | B60K 6/445 60/286 |
| 2011/0072799 A1 * | 3/2011 | Bidner | F01N 3/023 60/286 |
| 2013/0213009 A1 * | 8/2013 | Yacoub | F02D 41/0275 60/274 |
| 2014/0026851 A1 * | 1/2014 | Harmsen | F02D 41/30 123/344 |
| 2014/0090362 A1 * | 4/2014 | Eckhoff | F01N 3/0821 60/274 |

* cited by examiner

Primary Examiner — Patrick Maines
(74) Attorney, Agent, or Firm — Michael Best & Friedrich LLP

(57) ABSTRACT

The invention provides a method for regenerating an exhaust gas aftertreatment device of a vehicle having an internal combustion engine selectively operable to provide power to at least one driven wheel. The internal combustion engine is operated with a user-operable ignition control in an ON-mode. A user input is received to change the ignition control out of the ON-mode. The following sequence is performed in response to the user input to the ignition control: disconnecting a power transmission path between the engine and the at least one driven wheel, regenerating the exhaust gas aftertreatment device, and ceasing ignition of the internal combustion engine.

16 Claims, 3 Drawing Sheets

METHOD FOR REGENERATING AN EXHAUST GAS AFTERTREATMENT DEVICE

BACKGROUND OF THE INVENTION

With increased regulations regarding the emission of exhaust gases, in particular with respect to the exhaust of vehicle engines, many manufacturers have implemented exhaust gas aftertreatment devices to limit the number of pollutants released into the atmosphere. For example, a selective catalyst reduction (SCR) system converts nitrogen oxide from the exhaust gas to nitrogen, water and carbon dioxide. A catalytic converter (CAT) converts various pollutants such as carbon monoxide and hydrocarbons to less harmful compounds such as carbon dioxide and water. Exhaust gas recirculation (EGR) recycles a portion of the exhaust gas into the engine cylinders. A Lean $NO_X$ trap (LNT), also known as a $NO_X$ adsorber, traps $NO_X$ emissions until the LNT can be regenerated, whereby the $NO_X$ particles are converted to water and nitrogen. A diesel particulate filter (DPF) removes diesel particulate matter or soot from the exhaust gas of a diesel engine.

Diesel particulate filters contain a filter through which the exhaust gas must pass. The filter is a mesh, typically made of cordierite or silicon carbide, which prohibits large exhaust gas particles from flowing through the exhaust. As the engine provides more exhaust gas through the DPF, the large exhaust gas particles form ash or soot deposits on the filter, thereby limiting or blocking the passage of exhaust gas through the filter. Therefore, the filter is periodically regenerated. Filter regeneration is commonly accomplished by introducing high heat into the exhaust system. Typical regeneration temperatures are about 600 degrees Celsius, but can be lowered to approximately 350-450 degrees Celsius with the help of a catalyst. The regeneration removes the accumulated soot from the filter.

Lean $NO_X$ traps function in a similar manner to diesel particulate filters, but the filter of an LNT more closely functions as a sponge, wherein a substrate with precious metal loading within the filter traps $NO_X$ particles until the LNT is regenerated. In the regeneration of an LNT, the engine exhaust is made rich (e.g., air/fuel ratio less than stoichiometric) to regenerate the stored $NO_R$. The $NO_R$ molecules join with the hydrocarbons in the reactant to produce water and nitrogen.

Additionally, an LNT can be combined with a selective catalytic reduction system that converts $NO_R$ to nitrogen and water in the presence of ammonia. The ammonia is derived from the injection of a urea-water solution, commonly referred to as diesel exhaust fluid (DEF). In LNT-SCR systems, the LNT is relied on for $NO_R$ storage while the engine is still relatively cold and the SCR has not yet achieved its minimum effective operating temperature.

SUMMARY OF THE INVENTION

The invention provides, in one aspect, a method for regenerating an exhaust gas aftertreatment device of a vehicle having an internal combustion engine selectively operable to provide power to at least one driven wheel. The internal combustion engine is operated with a user-operable ignition control in an ON-mode. A user input is received to change the ignition control out of the ON-mode. The following sequence is performed in response to the user input to the ignition control: disconnecting a power transmission path between the engine and the at least one driven wheel, regenerating the exhaust gas aftertreatment device, and ceasing ignition of the internal combustion engine.

The invention provides, in another aspect, a method for regenerating an exhaust gas aftertreatment device in a vehicle having an internal combustion engine selectively operable to provide power to at least one driven wheel. An electronic clutch is provided between the internal combustion engine and the at least one driven wheel. A vehicle position holder is provided to secure the vehicle against movement when actuated. The electronic clutch is automatically energized to uncouple the internal combustion engine from the at least one driven wheel, the vehicle position holder is actuated, and the exhaust gas aftertreatment device is regenerated in response to a user input to stop operation of the internal combustion engine, prior to ceasing ignition in the internal combustion engine.

The invention provides, in yet another aspect, a method for regenerating an exhaust gas aftertreatment device coupled to an internal combustion engine of a vehicle. The method comprises the following sequence. The internal combustion engine is operated to provide motive power to the vehicle with an ignition control positioned in an ON-mode. A user input is received to change the ignition control out of the ON-mode to a mode not supporting operation of the internal combustion engine. A power transmission path is disconnected between the internal combustion engine and at least one driven wheel of the vehicle via a clutch. The engine is run at an air-fuel ratio less than stoichiometric thereby regenerating the exhaust gas aftertreatment device. The engine is shut off once the exhaust gas aftertreatment device has completed regeneration.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
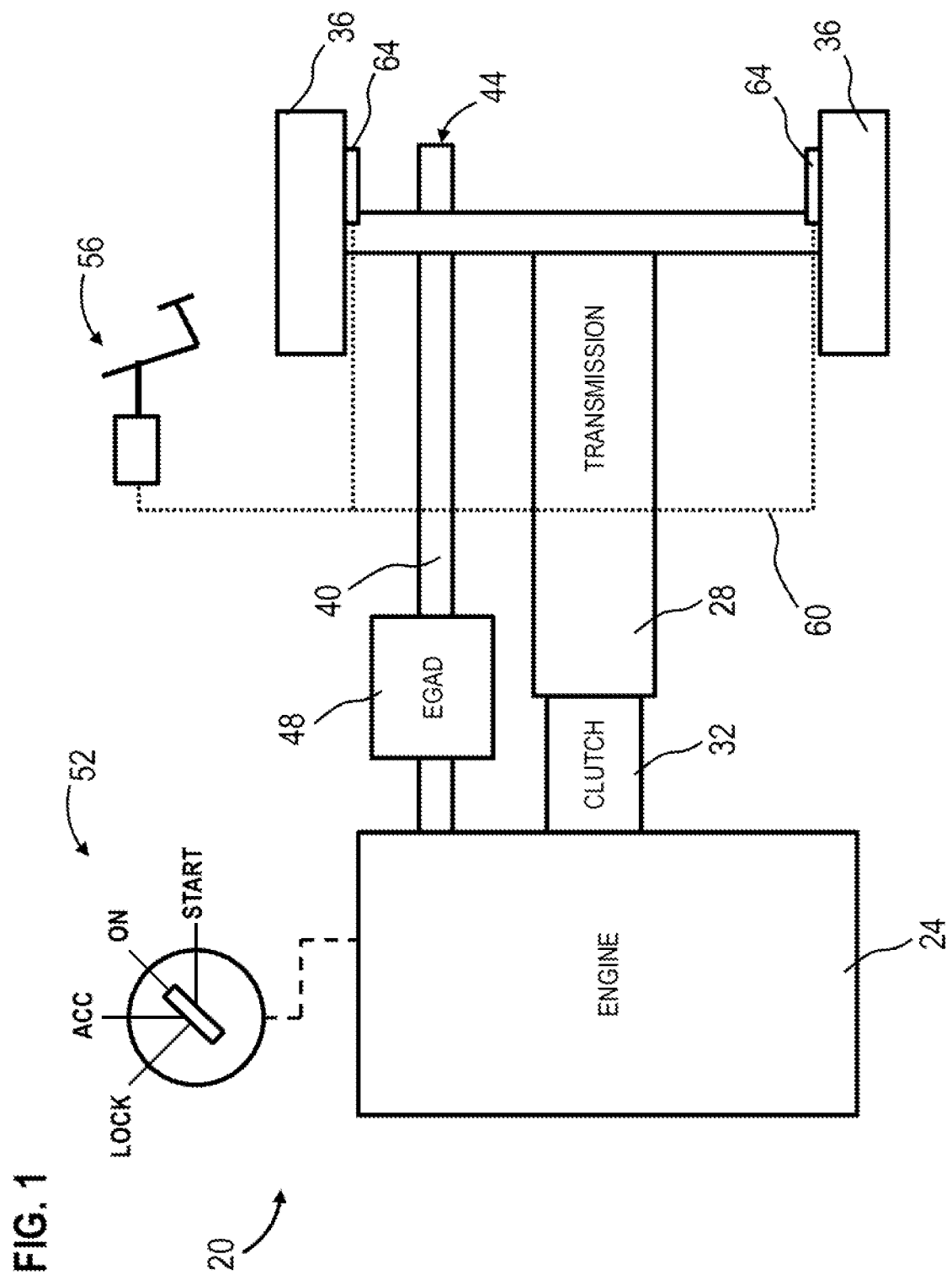
FIG. 1 is a schematic diagram of a vehicle with an exhaust gas aftertreatment device.

FIG. 1 illustrates a vehicle 20 with an internal combustion engine 24. The engine 24 is supplied with fuel (e.g., gasoline, diesel, biodiesel, bioethanol, etc.) that is ignited to provide motive force for the vehicle 20. The vehicle 20 is equipped with a transmission 28, and a clutch 32 located between the engine 24 and the transmission 28. The clutch 32 may or may not be required to operate at each gear change of the transmission 28. Therefore, the transmission 28 of the vehicle 20 may be an automatic or manual transmission. The clutch 32 is configured to selectively uncouple a power transmission path between the internal combustion engine 24 and at least one driven wheel 36 and may be embodied as an electronic clutch. Embodied as an electronic clutch, the clutch 32 is selectively actuated in response to an electronic signal which may correspond to a driver's physical input to a clutch pedal, but may alternatively or additionally be actuated in response to other inputs, either automated or manual. The power output of the engine 24 is transmitted to the at least one driven wheel 36 through the clutch 32 and the transmission 28. The vehicle 20, as shown in FIG. 1, includes two driven wheels 36.

The engine 24 is connected to an exhaust conduit 40 defining an internal passage for receiving and guiding combustion reaction exhaust gases away from the engine 24 and out to the environment. The exhaust conduit 40 can include multiple exhaust pipe segments and extends from a first end at the engine 24 to a second end 44 where the exhaust is released into the environment.

An exhaust gas aftertreatment device 48 is provided to limit or prevent certain pollutants from being released into the environment and can further define a portion of the exhaust conduit 40. The exhaust gas aftertreatment device 48 can be embodied as a lean $NO_X$ trap 48A, a diesel particulate filter 48B, or both, as shown in the vehicle 20B of FIG. 2. Lean $NO_X$ traps 48A and diesel particulate filters 48B prevent nitrogen oxides and large exhaust gas particles, respectively, from entering the environment. The exhaust gas aftertreatment device 48, as shown in FIG. 1, periodically fills up with the pollutant and must be regenerated to empty it out.

The lean $NO_X$ trap 48A may be regenerated by supplying a reactant, such as additional diesel fuel to the lean $NO_X$ trap 48A (e.g., increase fuel rate by increasing the number of injections or amount supplied per injection). Whether or not the fuel rate is increased, regeneration may also include reducing air mass from the engine 24 to the lean $NO_X$ trap 48A by throttling the engine 24 or by increasing an amount of recirculated exhaust gas (EGR). The diesel particulate filter 48B may be regenerated by supplying a reactant to the diesel particulate filter 48B (e.g., introducing additional fuel via late-cycle "post-injection", introducing additional fuel via direct injection in the exhaust pipe upstream of the diesel particulate filter 48B). Additionally or alternatively, the diesel particulate filter 48B may be regenerated by elevating a heat flux of the exhaust gas by increasing a turbocharger vane position to reduce turbocharger efficiency or increasing an auxiliary load on the engine 24. Further, air mass from the engine 24 to the diesel particulate filter 48B may be reduced by throttling the engine 24 or by increasing an amount of recirculated exhaust gas (EGR).

Figure 2:
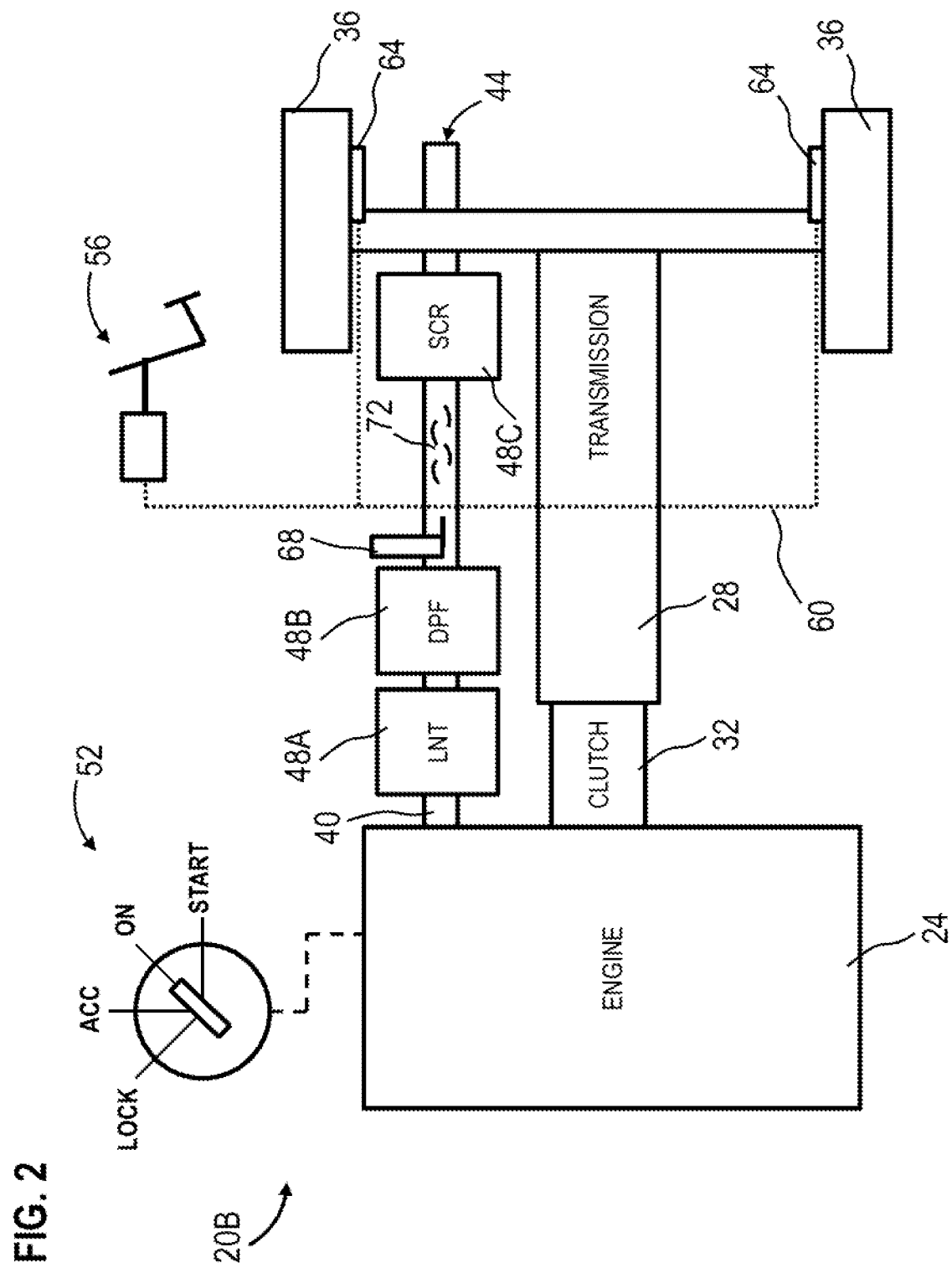
FIG. 2 is a schematic diagram of a vehicle with multiple exhaust gas aftertreatment devices including a lean $NO_X$ trap, a diesel particulate filter, and a selective catalytic reduction system.

As shown in FIG. 2, a selective catalytic reduction system 48C may be located downstream of the exhaust gas aftertreatment devices 48A, 48B. The selective catalytic reduction system 48C is regenerated by injecting a diesel exhaust fluid (e.g., urea-water mixture, ammonia) through an injector 68 located within the exhaust conduit 40 upstream of the selective catalytic reduction system 48C. The diesel exhaust fluid can mix with the exhaust gases in a mixing region 72 before entering the selective catalytic reduction system 48C. Exhaust gas aftertreatment devices such as lean $NO_X$ traps 48A and diesel particulate filters 48B may be located upstream of selective catalytic reduction systems 48C to trap pollutants, especially during cold starts of the vehicle 20B, when the selective catalytic reduction system 48C is less efficient. Although not shown, the exhaust conduit 40 can contain various additional components such as a turbocharger to increase engine power, and/or a muffler to reduce the noise of the exhaust.

The engine 24 is electronically connected to an ignition control 52. The ignition control 52 is a user-operable input device configured to activate the electrical systems of the vehicle 20. The ignition control 52 is configured to transition between various modes. As shown in FIG. 1, the ignition control 52 may be embodied as a keyed ignition switch with a LOCK-mode, an ACCESSORIES-mode, an ON-mode, and a START-mode.

The LOCK-mode permits the key to be removed from the ignition control 52 and, in automatic transmission vehicles, can only be actuated when the vehicle is placed in park. The ACCESSORIES-mode provides electrical power only to certain electronics within the cabin of the vehicle 20 (e.g., radio, power windows, etc.) without enabling ignition at the engine 24. The START-mode is a temporary mode that activates a starter motor solenoid, which enables the engine 24 to crank and start. The START-mode is only activated while pressure is applied by a user. Once the user pressure is removed, a biasing force returns the ignition control 52 to the ON-mode. When in the ON-mode, and with the transmission 28 in a driving gear (i.e., placing a shifter in drive, reverse for automatic transmissions, placing a shifter in any gear for manual transmissions), the engine 24 is allowed to operate (i.e., igniting a fuel-air mixture) and the vehicle 20 is configured to move under power of the internal combustion engine 24. Some keyed ignitions controls 52 may further include an OFF-mode that turns off the engine 24, but does not allow the key to be removed from the ignition control 52.

Alternatively, the ignition control 52 may be embodied as a push-start ignition device (e.g., pressable button or other device toggle). Similar in function to a keyed ignition switch, a push-start ignition device transitions between various modes, but without the use of a key as other means of verifying authorization for use of the ignition control 52 may be employed. Embodied as a push-start ignition device, the ignition control 52 may only alternate between an actuated and an un-actuated position, but various user actions (e.g., holding the push-start button down, tapping the push-start button, actuating the push-start button with or without the brake or clutch pedal depressed, etc.) may allow the push-start ignition device to mimic many or all of the modes of the keyed ignition switch. The push-start ignition device may be located within the vehicle 20 (e.g., on the dashboard, on the center console, etc.) or may be located on a remote device such as a key-fob to allow for remote starting.

The vehicle 20 further includes one or more vehicle position holders. For example, a parking brake 56, as shown in FIG. 1, utilizes a pedal and at least one mechanical brake cable 60 to actuate brakes 64 on one or more wheels 36 to prevent rotation of the wheels 36. The parking brake 56 may be otherwise embodied as a hand lever, pull tab, or alternative mechanical braking measure. Alternatively, the parking brake 56 may be embodied as an electric parking brake, which may or may not utilize the mechanical brake cable 60. Alternatively or additionally, the transmission 28, if an automatic transmission, can constitute a vehicle position holder as the shifter can be placed in PARK, whereby a parking mechanism engages with a geared section of the transmission 28 to prevent rotation of the wheels 36.

Figure 3:
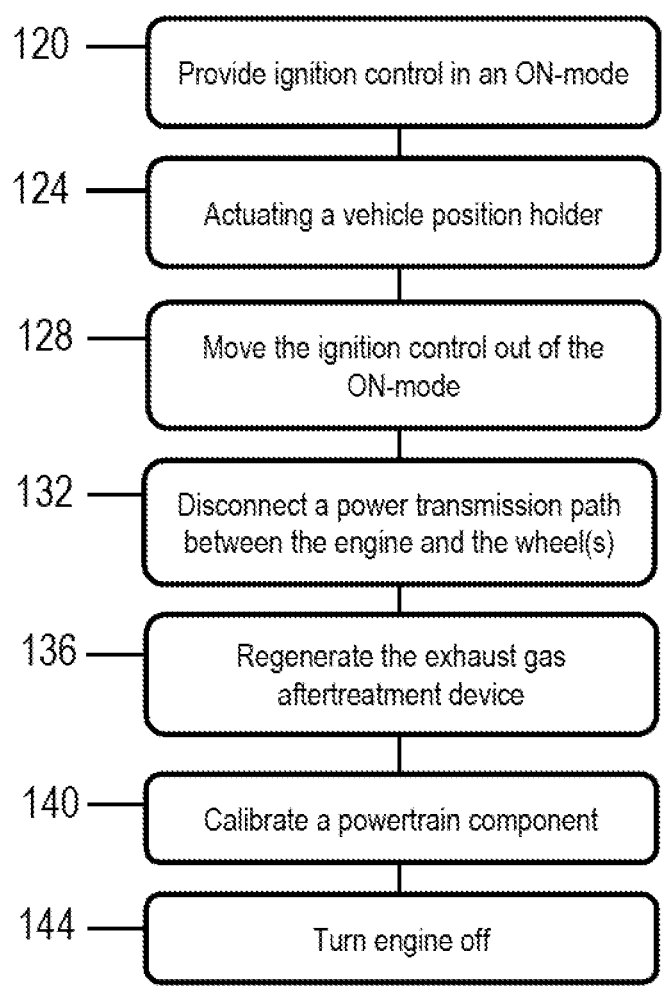
FIG. 3 is a flowchart illustrating a method for regenerating an exhaust gas aftertreatment device.

FIG. 3 illustrates a sequence for regenerating the exhaust gas aftertreatment device 48 as shown in FIG. 1. The method begins at step 120 with the ignition control 52 provided in an ON-mode. When in the ON-mode, and with the transmission 28 in a driving gear, the engine 24 is allowed to operate and the vehicle 20 is configured to move under power of the internal combustion engine 24. During step 120, the engine 24 is producing exhaust gases which pass through the exhaust gas aftertreatment device 48. As the nitrogen oxides or large particulates accumulate in the aftertreatment device 48, the $NO_X$ storage capacity is used up, or a blockage is formed in the exhaust conduit 40 which can increase temperatures and backpressure upstream of the aftertreatment device 48 resulting in poor engine performance, and can create uncontrolled regenerations of the aftertreatment device 48. Optimal performance of an exhaust gas aftertreatment device 48 upon an engine-start (i.e., cold-start) occurs when the aftertreatment device 48 is emptied upon the previous shutdown of the vehicle 20. Therefore, the ideal scenario is to empty the aftertreatment device 48 immediately prior to shutting off the engine 24. However, this is not normally feasible, nor convenient for the vehicle operator who will typically desire to exit the vehicle immediately upon reaching a final destination.

In step 124, the vehicle position holder, such as the parking brake 56 (applicable with manual or automatic transmissions) or the PARK position of the automatic transmission, is actuated. At step 128, the ignition control 52 is moved out of the ON-mode. The ignition control 52 is otherwise placed into an OFF-mode, a LOCK-mode, or an ACCESSORIES-mode. Moving the ignition control 52 away from the ON-mode is one example of a user input used to command stopping operation of the internal combustion engine 24. However, the engine 24 continues to run as the power transmission path between the engine 24 and the wheels 36 is disconnected at step 132. In some situations, step 132 obviates the necessity for step 124; however, the power transmission path disconnection may be used as a back-up to the vehicle position holder. The transmission path may be disconnected with the clutch 32, which is optionally an electronic clutch. The electronic clutch may be automatically energized to uncouple the engine 24 from the wheels 36 in response to step 128. Alternatively or additionally, a controller (not shown) may first analyze the state of the aftertreatment device 48 to determine whether regeneration is necessary.

Once the power transmission path is disconnected, the exhaust gas aftertreatment device 48 is regenerated at step 136. The regeneration process includes providing a reactant, such as diesel fuel to the aftertreatment device 48. The engine 24 may be run at an air-fuel ratio less than stoichiometric in order to provide the additional diesel fuel used as the reactant. The regeneration process may take only a few seconds (e.g., 2 seconds, 5 seconds, 10 seconds, etc.).

Once the regeneration process of step 136 is complete, one or more powertrain components (e.g., fuel injector, exhaust gas oxygen sensor, etc.) may optionally be calibrated at step 140. Alternatively, the calibration of the powertrain component(s) may run concurrently with or before the regeneration process of step 136 after receiving user command to stop the engine 24. The engine 24 is allowed to run without transferring power to the wheels 36, as shown in steps 128, 132. Therefore, the powertrain component(s) can be calibrated without disrupting movement of the vehicle 20. Once the exhaust gas aftertreatment device 48 is regenerated and the optional powertrain component calibration is completed, as commanded in step 128, the engine 24 is shut off, as shown in step 144.

Conventional powertrain component calibrations, run when the engine 24 is idling (i.e., the engine 24 is running but there is no power request) or in overrun (i.e., when the vehicle 20 is moving down a steep hill and the engine load is small), cannot be run in modern vehicles equipped with automatic start-stop operation. In automatic stop-start operation, the engine 24 is automatically shut off when the vehicle 20 is stopped and/or when the engine 24 is in overrun. Therefore, the powertrain component calibrations cannot be run in these conditions if the vehicle is equipped with automatic stop-start operation.

The method shown in FIG. 3 applies to various configurations of exhaust gas aftertreatment devices 48, and is not limited to the configurations of illustrated vehicles 20, 20B. For example, the method shown in FIG. 3 can apply to a vehicle 20B with a lean $NO_X$ trap 48A, a diesel particulate filter 48B, and a selective catalytic reduction system 48C, as shown in FIG. 2, or any combination of the aforementioned exhaust gas aftertreatment devices 48.

The method shown in FIG. 3 may occur every time that the ignition control 52 is changed away from the ON-mode to a mode in which the engine 24 is non-operational. Although the regeneration process may delay the actual ceasing of engine operation requested by the operator, the operator can be informed of this process, and may exit the vehicle as normal with the understanding that the engine 24 will turn off automatically after a brief moment. Alternatively, a controller (not shown) may first analyze the state of the aftertreatment device 48 to determine whether regeneration is necessary. Sensors (not shown) may be provided within the aftertreatment device 48 and coupled to the controller to determine the level of pollutant build-up. Alternatively or additionally, the sequence of FIG. 3 may only occur if a specified run time of the engine 24 is surpassed.

What is claimed is:

1. A method for regenerating an exhaust gas aftertreatment device in a vehicle having an internal combustion engine selectively operable to provide power to at least one driven wheel, the method comprising:
    operating the internal combustion engine with a user-operable ignition control in an ON-mode;
    receiving a user input to change the ignition control out of the ON-mode; and
    performing the following sequence in response to the user input to the ignition control:
        automatically energizing an electronic clutch positioned between the internal combustion engine and the at least one driven wheel to uncouple the internal combustion engine from the at least one driven wheel,
        regenerating the exhaust gas aftertreatment device, and
        ceasing ignition of the internal combustion engine.

2. The method of claim 1, wherein the exhaust gas aftertreatment device is a lean $NO_X$ trap, and wherein regenerating the exhaust gas aftertreatment device includes one or more of:
    supplying a reactant to the lean $NO_X$ trap,
    reducing an air mass from the engine to the lean $NO_X$ trap by throttling the engine, and
    reducing the air mass from the engine to the lean $NO_X$ trap by increasing an exhaust gas recirculation amount.

3. The method of claim 1, wherein regenerating the exhaust gas aftertreatment device includes running the internal combustion engine at an air-fuel ratio less than stoichiometric.

4. The method of claim 1, wherein the exhaust gas aftertreatment device is a diesel particulate filter, and wherein regenerating the diesel particulate filter includes one or more of:
    supplying a reactant to the diesel particulate filter, elevating a heat flux to the diesel particulate filter by increasing a turbocharger vane position or increasing an auxiliary load on the engine, and reducing an air mass from the engine to the lean $NO_X$ trap by throttling the engine or increasing an exhaust gas recirculation amount.

5. The method of claim 1, further comprising calibrating a powertrain component after the internal combustion engine is uncoupled from the at least one driven wheel.

6. The method of claim 5, wherein calibrating the powertrain component includes calibrating one or both of a fuel injector and an exhaust gas oxygen sensor.

7. A method for regenerating an exhaust gas aftertreatment device in a vehicle having an internal combustion engine selectively operable to provide power to at least one driven wheel, the method comprising:

providing an electronic clutch between the internal combustion engine and the at least one driven wheel;

providing an electronic parking brake to secure the vehicle against movement when actuated;

automatically energizing the electronic clutch to uncouple the internal combustion engine from the at least one driven wheel in response to a user input to stop operation of the internal combustion engine, prior to ceasing ignition in the internal combustion engine;

automatically actuating the electronic parking brake in response to the user input to stop operation of the internal combustion engine, prior to ceasing ignition in the internal combustion engine; and automatically regenerating the exhaust gas aftertreatment device in response to the user input to stop operation of the internal combustion engine, prior to ceasing ignition in the internal combustion engine.

8. The method of claim 7, wherein the exhaust gas aftertreatment device is a lean $NO_X$ trap, and wherein regenerating the exhaust gas aftertreatment device includes one or more of:

supplying a reactant to the lean $NO_X$ trap, reducing an air mass from the engine to the lean $NO_X$ trap by throttling the engine, and reducing the air mass from the engine to the lean $NO_X$ trap by increasing an exhaust gas recirculation amount.

9. The method of claim 7, wherein the exhaust gas aftertreatment device is a diesel particulate filter, and wherein regenerating the diesel particulate filter includes one or more of:

supplying a reactant to the diesel particulate filter, elevating a heat flux to the diesel particulate filter by increasing a turbocharger vane position or increasing an auxiliary load on the engine, and reducing an air mass from the engine to the lean $NO_X$ trap by throttling the engine or increasing an exhaust gas recirculation amount.

10. The method of claim 7, further comprising calibrating a powertrain component after energizing the electronic clutch.

11. The method of claim 10, wherein calibrating the powertrain component includes calibrating one or both of a fuel injector and an exhaust gas oxygen sensor.

12. A method for regenerating an exhaust gas aftertreatment device coupled to an internal combustion engine of a vehicle, the method comprising the following sequence:

operating the internal combustion engine to provide motive power to the vehicle with an ignition control in an ON-mode;

receiving a user input to change the ignition control out of the ON-mode to a mode not supporting operation of the internal combustion engine;

automatically energizing an electronic clutch in response to an electronic signal generated by the ignition control changing out of the ON-mode, the electronic clutch uncoupling the internal combustion engine from at least one driven wheel of the vehicle;

running the engine at an air-fuel ratio less than stoichiometric thereby regenerating the exhaust gas aftertreatment device; and shutting off the engine once the exhaust gas aftertreatment device has completed regeneration.

13. The method of claim 12, wherein the exhaust gas aftertreatment device is a lean $NO_X$ trap, and wherein regenerating the exhaust gas aftertreatment device includes one or more of:

supplying a reactant to the lean $NO_X$ trap, reducing an air mass from the engine to the lean $NO_X$ trap by throttling the engine, and reducing the air mass from the engine to the lean $NO_X$ trap by increasing an exhaust gas recirculation amount.

14. The method of claim 12, wherein the exhaust gas aftertreatment device is a diesel particulate filter, and wherein regenerating the diesel particulate filter includes one or more of:

supplying a reactant to the diesel particulate filter, elevating a heat flux to the diesel particulate filter by increasing a turbocharger vane position or increasing an auxiliary load on the engine, and reducing an air mass from the engine to the lean $NO_X$ trap by throttling the engine or increasing an exhaust gas recirculation amount.

15. The method of claim 12, further comprising calibrating a powertrain component after the internal combustion engine is uncoupled from the at least one driven wheel.

16. The method of claim 15, wherein calibrating the powertrain component includes calibrating one or both of a fuel injector and an exhaust gas oxygen sensor.

* * * * *